Patented Nov. 8, 1932

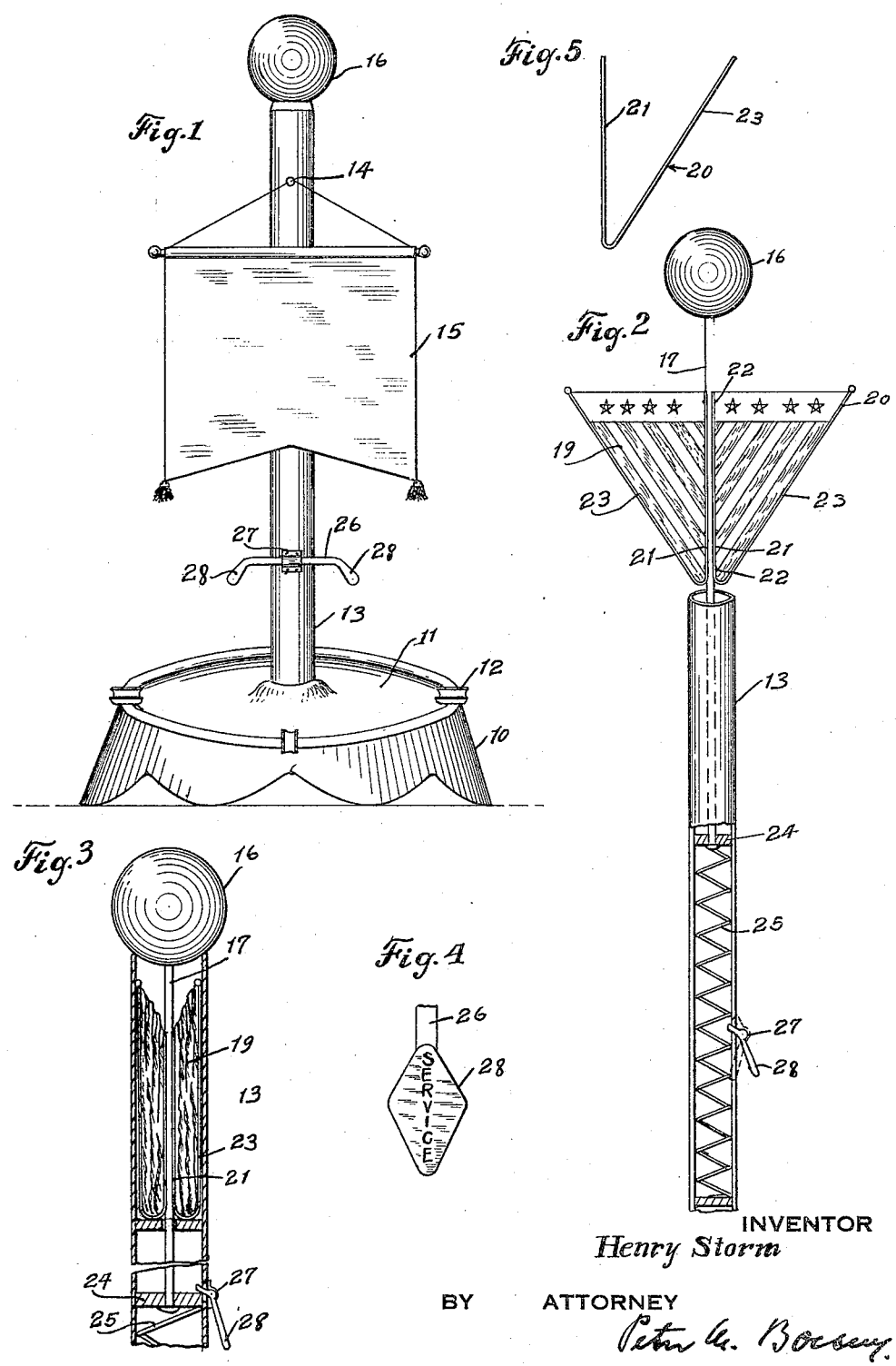

1,886,452

UNITED STATES PATENT OFFICE

HENRY STORM, OF NEW YORK, N. Y.

COMBINED ASHTRAY AND SIGNAL DEVICE

Application filed January 6, 1932. Serial No. 584,926.

This invention relates to new and useful improvements in means whereby to call the attention of servants, and especially waiters or waitresses in restaurants, to the needs of their guests or parties.

Another object is in this connection to provide a novel and decorative ashtray, which also will prove of considerable value as an advertising medium.

As the construction of this device is comparatively simple, the cost of manufacturing should be proportionately small.

With the above and other objects in view, this invention consists of the novel features of construction, combination and arrangement of parts, hereinafter fully described, claimed and illustrated in the accompanying drawing forming part of this specification, and in which similar characters of reference indicate corresponding parts in all views, and in which:

Figure 1 is a front elevational view of my device;

Figure 2 is a front elevational detail view, with a part broken away, and in section;

Figure 3 is a vertical transverse view of part of my invention; while

Figure 4 is a detail view; and

Figure 5 shows another view of a part in detail.

Referring more particularly to the drawing, 10 indicates an ashtray, having the usual concave depression 11 for receiving cigar and cigarette ashes, and the means 12 for resting cigars and cigarettes upon the said tray.

In the center of the said ashtray is integrally attached in any suitable manner a cylindrical hollow tube 13; and upon the outer surface of the said tube is disposed a knob 14 adapted to receive a cord from which an ornamental cloth or flag is suspended.

The said cylindrical tube 13, which is open at its top, has normally a globe or ball 16 arranged upon said open top portion. The said globe is integrally connected to a thin, stiff, preferably metal rod 17; to the latter is also attached the flag-like members 19, comprising two preferably triangular pieces of textile material, such as cloth or silk.

The arrangement of the said flag-members 19 is as follows: Upon each side of the said rod 17 are arranged two elastic, preferably flat spring formed members 20, each of which is bent upon itself, as shown especially in Figure 5, to also have a substantially triangular form, when not compressed. The said members 20 have one arm 21 attached to the rod 17 in any suitable manner, as by rivets, as shown at 22. Between the said arm 21 and the longer arm 23 of the said members 20 is then arranged, as by sewing or cementing, the triangular pieces of cloths or flags 19.

It is evident that when the flat spring-members 20 are in a released position, as shown in Figure 2, the said members will unfold and consequently the flags 19 spread out, whereas, when the said members 20 are compressed, the said flags will be folded up, as shown in Figure 3.

The rod 17 has upon its lower end solidly mounted a disk 24; while inside the cylindrical tube 13 is arranged a coiled spring 25, which in its loose or extended position is adapted to co-operated with the said rod 17 by pressing upon the disk 24, thereby making the said rod, upon disengagement of the disk 24, shoot upward, and the flags 19 incidentally to unfold.

The spring 25 is controlled and normally held in a compressed state by means of a lever 26, which is pivotally arranged upon the side of the said tube 13, as shown at 27 in Figure 2.

The said lever terminates on each side in handles 28, upon which the word service is inscribed, as shown in Figure 4.

The operation is thus as follows, when a guest desires to call a waiter, he just turns the lever 26, whereby the spring becomes disengaged and in turn carries the rod upward, whereupon the globe 16 rises to a high elevated position, and the flag or cloth 19 unfolds.

When the waiter has noticed the signal and arrives at the table of the guest, he then presses the globe 16 downward until the rod 17 by means of the disk 24 again has compressed the spring. At the same time he turns the lever 26, so that the latter engages the disk 24, or projects over the said disk, thereby securing the spring in compressed or inactive position.

It is also within the provision of this device to make the lever 26 turn automatically, and engage the said disk after the latter has passed the said lever.

It is obvious that changes may be made in the form, construction and arrangement of the several parts, as shown within the scope of the appended claims, without departing from the spirit of the invention, and I do not therefore wish to limit myself to the exact construction and arrangement shown and described herein.

What I claim as new, and desire to secure by Letters Patent of the United States, is:

1. In a device of the class described, the combination of an ashtray with an upright hollow member, a vertical rod disposed in the latter, substantially triangularly bent leaf-springs attached to the said rod and adapted to collapse and fold against the latter upon submersion of the said rod within the hollow member, flags attached to the said leaf-springs, and means co-acting with said rod for release of the said springs and unfolding of the flags.

2. In a device of the class described, the combination of an ashtray with an upright hollow member, a vertical rod having a globe upon its top and a disk at its lower end, the said rod being mounted in the hollow member, substantially triangularly bent leaf-springs connected to the said rod and adapted to collapse and fold against the latter upon submersion of the said rod within the hollow member, flags attached to the said leaf-springs, and means acting upon the disk of the said rod to release the springs and unfold the flags.

3. In a device of the class described, the combination of an ashtray with an upright hollow member, a vertical rod disposed in the latter, the said rod having a globe mounted upon its top, and a disk attached to its lower end, a coiled spring arranged in the lower portion of the hollow member for co-operation with the said disk and rod, means for compressing and releasing the said coiled spring, substantially triangularly bent leaf-springs connected to the rod, and adapted to collapse and fold against the latter upon submersion of the said rod within the hollow member, and flags attached to the said leaf-springs.

4. In a device of the class described, the combination of a vessel-formed base with an upright hollow member, a vertical rod disposed in the latter, the said rod having a globe mounted upon its top, and a disk attached to its lower end, a coiled spring arranged in the lower portion of the hollow tube for co-operation with the said disk and rod, means pivotally attached to the said hollow member for compressing and releasing the said coiled spring, substantially triangularly bent leaf-springs connected to the said rod and adapted to collapse and fold against the latter upon submersion of the said rod within the hollow member, and flags attached to the said leaf-springs.

5. In a device of the class described, the combination of an ashtray with an upright hollow member, a vertical rod disposed in the latter, the said rod having a globe mounted upon its top, and a disk attached to its lower end, a coiled spring arranged in the lower portion of the hollow tube for co-operation with the said disk and rod, triangularly bent leaf-springs connected to the rod, signal-flags attached to the former, and means for releasing the coiled spring, the said means terminating in handle-indicators, and being pivotally attached to the said hollow tube.

Signed at New York city, in the county of New York, and State of New York, this 18th day of December, A. D. 1931.

HENRY STORM.